United States Patent [19]

Westlinning et al.

[11] 3,928,344
[45] Dec. 23, 1975

[54] PHENYLENEDIAMINE-S-TRIAZINES

[75] Inventors: Hermann Westlinning, Kleinostheim; Werner Schwarze, Frankfurt; Horst Fleischhauer, Grossauheim, all of Germany

[73] Assignee: Deutsche Gold-und Silber-Scheideanstalt vormals Roessler, Germany

[22] Filed: May 24, 1974

[21] Appl. No.: 473,168

Related U.S. Application Data

[62] Division of Ser. No. 316,565, Dec. 19, 1972, Pat. No. 3,828,002.

[30] Foreign Application Priority Data

Dec. 27, 1971 Germany............................ 2164800

[52] U.S. Cl. ....... 260/249.5; 260/249.6; 260/249.8; 260/249.9; 260/243 B; 260/247.5 C; 260/45.8 N
[51] Int. Cl.² .............. C07D 251/16; C07D 251/38; C07D 251/42
[58] Field of Search.......... 260/249.5, 249.8, 249.6, 260/249.9, 243 B, 247.5 C

[56] References Cited
UNITED STATES PATENTS

| | | | |
|---|---|---|---|
| 2,524,727 | 10/1950 | Dudley......................... | 260/249.6 X |
| 3,149,100 | 9/1964 | Hindermann et al. ........ | 260/249.5 X |
| 3,240,749 | 3/1966 | Dexter et al. ................... | 260/45.8 |
| 3,291,796 | 12/1966 | Ross et al. ..................... | 260/249.5 |
| 3,309,345 | 3/1967 | Lutwack ..................... | 260/249.5 X |
| 3,658,783 | 4/1972 | Knobloch et al. ............ | 260/249.5 X |
| 3,755,322 | 8/1973 | Winter et al................... | 260/249.9 X |
| 3,758,469 | 9/1973 | Diamond et al. .............. | 260/249.9 |
| 3,767,656 | 10/1973 | Diamond et al. ................ | 260/249.9 |

FOREIGN PATENTS OR APPLICATIONS

| | | |
|---|---|---|
| 1,126,804 | 11/1968 | United Kingdom |
| 1,045,431 | 10/1966 | United Kingdom |
| 1,011,984 | 12/1965 | United Kingdom |
| 879,170 | 10/1961 | United Kingdom |
| 642,457 | 6/1947 | United Kingdom |
| 1,172,266 | 6/1964 | Germany |

*Primary Examiner*—John M. Ford
*Attorney, Agent, or Firm*—Cushman, Darby & Cushman

[57] ABSTRACT

There are prepared 1,3,5-triazines of the formula:

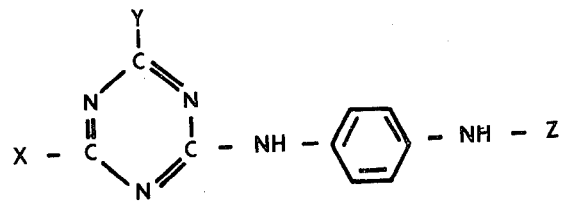

where X and Y are $SR_1$ where $R_1$ is alkyl of 1 to 12 carbon atoms or aryl, CN, $OR_2$ where $R_2$ is hydrogen, alkyl of 1 to 12 carbon atoms, aryl, allyl or methallyl, phenyl p-phenylenediamino,

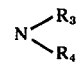

where $R_3$ and $R_4$ are hydrogen, alkyl of 1 to 18 carbon atoms, alkyl of 1 to 18 carbon atoms substituted with —OH, —CN or $OR_5$ where $R_5$ is alkyl of 1 to 18 carbon atoms, allyl, methallyl, cycloalkyl of 5 to 8 carbon atoms, aryl or benzyl, one of $R_3$ and $R_4$ is alpha or beta naphthyl and the other is hydrogen, $R_3$ and $R_4$ together with the nitrogen atom form a 5 to 8 membered ring which has from 4 to 7 —$CH_2$— groups of which 0 or 1 hydrogen atom is or of which 2 hydrogen atoms attached to different carbon atoms are substituted by lower alkyl, $R_3$ and $R_4$ together with the nitrogen atom form a 5 to 8 membered ring which has from 3 to 6 —$CH_2$— groups of which 0 or 1 hydrogen atom is or of which 2 hydrogen atoms attached to different carbon atoms are substituted by lower alkyl and said ring has one hetero oxygen or sulfur atom or $NR_6$ where $R_6$ is hydrogen or lower alkyl, or X is chlorine, Z is hydrogen, alkyl of 1 to 8 carbon atoms, cycloalkyl of 5 to 8 carbon atoms, phenyl, benzyl, acyl of the formula

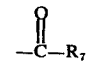

where $R_7$ is alkyl of 1 to 18 carbon atoms, benzyl or phenyl or the group

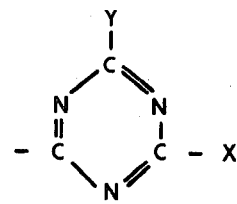

The compounds are useful to stabilize vulcanized and vulcanizable natural and synthetic rubber compositions.

22 Claims, No Drawings

PHENYLENEDIAMINE-S-TRIAZINES

This is a division, of application Ser. No. 316,565 filed Dec. 19, 1972 now U.S. Pat. No. 3,828,002.

The invention is directed to new 1,3,5-triazine compounds which have the phenylenediamine group or phenylenediamine derivatives as ligands and their industrial uses, especially as stabilizers for rubber containing products.

It is known that rubber vulcanizates with increasing life undergo structural change which leads to a reduction of its useful value. The cause of this change is the influence of oxygen, ozone, light and heat, individually or in combination. If there is simultaneously present a dynamic stress of the rubber vulcanizate then the influence of these factors is increased. In order to stabilize the rubber against these quality reducing influences, there are known a whole series of materials which are included under the name "ageing inhibitors" or "fatigue inhibitors". Many of the customary ageing inhibitors do not serve as fatigue inhibitors, especially those which are non-staining.

Known anti-ageing agents for rubber products are secondary aromatic amines such as N-phenyl- α- or -β- naphthylamine or substituted p-phenylene-diamine as perhaps N-cyclohexyl-N'-phenyl-p-phenylenediamine or N-isopropyl-N'-phenyl-p-phenylenediamine; additional anti-agers are N-(1,3-dimethylbutyl)-N'-phenyl-p-phenylenediamine, N,N'-di-1,4-dimethylpentyl-p-phenylenediamine, N,N'-di-1-methylheptyl-p-phenylenediamine, N,N'-diphenyl-p-phenylenediamine, di-β- naphthyl-p-phenylenediamine, 2,2,4- trimethyl-1, 2-dihydro-6-ethoxy quinoline, 6-dodecyl-2,2,4-trimethyl-1,2-dihydro quinoline, poly-2,2,4-trimethyl-1, 2-dihydroquinoline, 4,4'-thiobis-(2-tert. butyl -5-methylphenol), 4,4'-butylidene-bis-(2-tert. butyl-5-methylphenol), 2,2'-methylene-bis-(4-methyl-6-tert. butylphenol), 2,6-di-tert.butyl-p-cresol, 4,4'-dihydroxydiphenyl, 2-mercapto-benzimadazole, the zinc salt of 2-mercaptobenzimidazole and ozone protective wax. There are also used as anti-aging agents diphenylamine derivatives, mixtures of aralkylated phenols, mixtures of alkyl and aralkyl substituted phenols, benzofurane derivatives, steric hindered bisphenols as well as certain condensation products from aldol and α-naphthylamine, reaction product of acetone and diphenylamine and the reaction product of 6-tert. butyl-m-cresol and $SCl_2$. Sometimes these materials are used in mixtures with each other.

The p-phenylenediamine derivatives protect the rubber products against the effects of ozone and against fatigue. However, they have the important disadvantage that they are not resistant to light and hence they lead to the discoloration of rubber. This disadvantage is strongly evident in light colored or white rubber products. In carbon black filled products this discoloration is masked but the discolorations of materials such as, for example, lacquers, films or light colored synthetic resins, including elastomers, in contact with the rubber products are not prevented thereby. Such contact discolorations are especially known and feared in the automotive industry.

There have already been proposed numerous derivatives of 1,3,5-triazines for various use. These triazines, for example, have in the 2-, 4- and/or in the 6- position halogen atoms as well as sulfur and/or nitrogen containing ligands; they have also been proposed, among others, for use in the stabilization of organic materials, as, for example, polymers (U.S. Pat. Nos., Dexter 3,240,749, Dexter 3,245,992, Dexter 3,257,354, Pines 3,418,272 and Biland 3,530,127, British Pat. No. 977,589 and French Pat. No. 675,785, etc.). In Dexter Pat. No. 3,257,354, for example, there is disclosed that natural rubber or synthetic rubber, as for example, cis-polyisoprene or styrene-butadiene rubber can be protected against oxidative decomposition by triazine compounds which have free OH-containing phenyl groups. The activity of these products is obviously tied to the presence of free phenol groups.

There is also a series of different triazine derivatives which can be used in special manner for the protection of organic materials against ultraviolet rays (see German Auslegeschrifts 1,240,083 and 1,241,452). These compounds also contain phenyl substituents with attached free OH groups.

In the above cited French patent there is a shotgun disclosure of an extremely large number of derivatives of s-triazines with many ligands which are not specifically defined or definable. These ligands can be bound to the triazine ring either directly or by way of the hetero atoms oxygen, nitrogen or sulfur. Among the derivable triazine derivatives there are found very many which do not have any anti-aging effect in rubber vulcanizates. Even in the three specific examples triazines are named which, as is evident from the test values recited, give practically no protection in the vulcanizates against ageing. Also in the French patent, there is disclosed no rule which shows which of the numered and very different trazine derivatives either are or could be effective anti-ageing agents.

From the extraordinarily large number of known triazine derivatives a choice has now been found and surprisingly derivatives of 1,3,5-triazines found which unforeseeably produce valuable and industrially outstanding properties in rubber vulcanizates.

There are prepared 1,3,5-triazines of the formula:

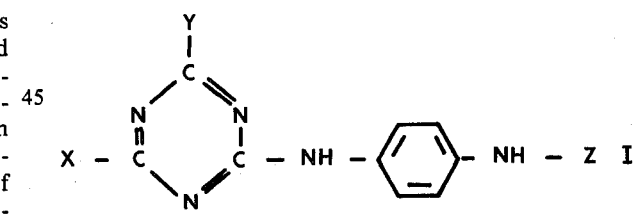

where X and Y are the same or different and are (A) $SR_1$ where $R_1$ is alkyl of 1 to 12 carbon atoms or aryl, (B) CN, (C) $OR_2$ where $R_2$ is hydrogen, alkyl of 1 to 12 carbon atoms, aryl, allyl or methallyl, (D) phenyl p-phenylenediamino of the formula

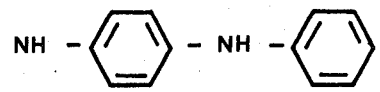

(E) 

where $R_3$ and $R_4$ are (a) hydrogen, (b) alkyl of 1 to 18 carbon atoms, (c) alkyl of 1 to 18 carbon atoms substituted with -OH, -CN or OR₅ where R₅ is alkyl of 1 to 18 carbon atoms, (d) allyl, (e) methallyl, (f) cycloalkyl of 5 to 8 carbon atoms, (g) aryl or (h) benzyl, (i) one of R₃ and R₄ is alpha or beta naphthyl and the other is hydrogen, (k) R₃ and R₄ together with the nitrogen atom from a 5 to 8 membered preferably a 5 or 6 membered ring which has from 4 to 7 preferably 4 or 5 - CH₂ - groups of which 0 or 1 hydrogen atom is or of which 2 hydrogen atoms attached to different carbon atoms are substituted by lower alkyl, (1) R₃ and R₄ together with the nitrogen atom form a 5 to 8 membered preferably a 5 or 6 membered ring which has from 3 to 6 preferably 3 or 4 -CH₂- groups of which 0 or 1 hydrogen atom is of which 2 hydrogen atoms attached to different carbon atoms are substituted by lower alkyl and said ring has one hetero oxygen or sulfur atom or NR₆ where R₆ is hydrogen or lower alkyl, or X is chlorine, Z is hydrogen, alkyl of 1 to 8 carbon atoms, cycloalkyl of 5 to 8 carbon atoms, phenyl, benzyl, acyl of the formula

where R₇ is alkyl of 1 to 18 carbon atoms, benzyl or phenyl or the group

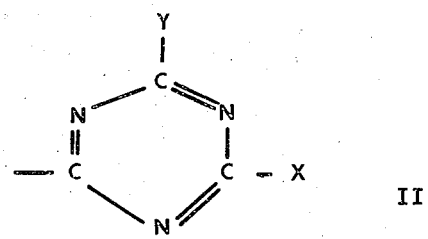

All of the named alkyl groups can be straight or branched chain.

In the case of substituted alkyl groups they are preferably mono- or di-substituted, especially monosubstituted. Aryl in the definition for X an Y is especially phenyl, which in a given case is substituted by lower alkyl or methoxy groups. Lower alkyl groups are those containing 1 to 5 carbon atoms. Preferably the radicals X and Y of the group of formula II are the same as the radicals X and Y of general formula I.

The compounds of the claimed type are produced in conventional manner. As starting material for the synthesis there is especially employed cyanuric chloride.

If p-phenylenediamine is added as the aromatic amine component there is always first obtained the condensation product with 2 moles of cyanuric chloride, N,N'-bis(4,6-dichloro-1,3,5-triazine-2-yl)-p-phenylenediamine. The further substitution of the chlorine atom by ammonia, amines, alcohols, phenols and/or mercaptans is carried out by conventional manner.

If there is reacted with cyanuric chloride p-phenylenediamine having a substituent on one —NH₂ group, there are always obtained condensation products which contain for one mole of triazine one mole of the substituted phenylenediamine. The further reactions on the triazine ring can be carried out by known methods.

Examples of substituted p-phenylenediamines which can be used include N-methyl p-phenylenediamine, N-ethyl p-phenylenediamine, N-propyl p-phenylenediamine, N-butyl p-phenylenediamine, N-sec. butyl p-phenylenediamine, N-octyl p-phenylenediamine, N hexyl p-phenylenediamine, N-cyclopentyl p-phenylenediamine, N-cyclohexyl p-phenylene diamine-N-2-methylcyclohexyl-p-phenylenediamine, N-cyclooctyl p-phenylenediamine, N-phenyl p-phenylenediamine, N-benzyl p-phenylenediamine, N-acetyl p-phenylenediamine, N-propionyl p-phenylenediamine, N-butyryl p-phenylenediamine, N-valeroyl p-phenylenediamine, N-lauroyl p-phenylenediamine and N-stearoyl p-phenylenediamine.

Examples of amine, alcohols, phenols and mercaptans which can be used to react with the phenylenediamine-cyanuric chloride reaction product are methylamine, dimethylamine, ethylamine, diethylamine, propylamine, dipropylamine, isopropylamine, butylamine, dibutylamine, sec. butylamine, di sec.butylamine, t-butylamine, methyl butyl amine, amylamine, diamylamine, 1,4-dimethylbutylamine, hexylamine, octylamine, dioctylamine, isooctylamine, decylamine, laurylamine, dilaurylamine, octadecylamine, dioctadecylamine, ethanolamine, diethanolamine, propanolamine, dipropanolamine, butanolamine, allylamine, diallylamine, cyanoethylamine, cyclohexylamine, dicyclohexylamine, cyclopentylamine, cyclooctylamine, morpholine, α-naphthylamine, β-naphthylamine, benzylamine, dibenzylamine, aniline, N-methyl aniline, N-ethyl aniline, N-butyl aniline, N-amyl aniline, toluidine, piperazine, piperidine, thiomorpholine, pyrrolidine, methallyl amine, methoxyethyl amine, ethoxy ethylamine, octoxypropyl amine, octadecoxyethylamine, methyl mercaptan, ethyl mercaptan, propyl mercaptan, butyl mercaptan, hexyl mercaptan, octyl mercaptan, decyl mercaptan, dodecyl mercaptan, methyl alcohol, ethyl alcohol, isopropyl alcohol, butyl alcohol, t-butyl alcohol, amyl alcohol, hexyl alcohol, cyclohexyl alcohol, octyl alcohol, isooctyl alcohol, decyl alcohol, isodecyl alcohol, nonyl alcohol, dodecyl alcohol, allyl alcohol, methallyl alcohol, thiophenol, thiocresol, phenol, m-cresol, xylenol, p-ethyl phenol, p-butylphenol, p-cresol, ocresol, p-amylphenol.

There can also be used as starting materials 2,4-dichloro-6-aminotriazine, 2,4-dichloro-6-methoxy triazine, 2,4-dichloro-6-methylmercapto triazine, 2,4-dichloro-6-octoxytriazine, 2,4-dichloro-6-phenoxytriazine, 2,4-dichloro-6-methylaminotriazine, 2,4-dichloro-6-octadecylaminotriazine, 2,4-dichloro-6-allylaminotriazine and similar triazines which can be reacted in place of cyanuric chloride with p-phenylenediamine or the N-substituted p-phenylenediamines mentioned above.

In the following tables there are set forth representative compounds within the invention. They can be prepared by the general procedures set forth above and more specifically can be prepared by the specific procedures set forth below:

(a) Compounds of the general formula III as set forth in Table 1

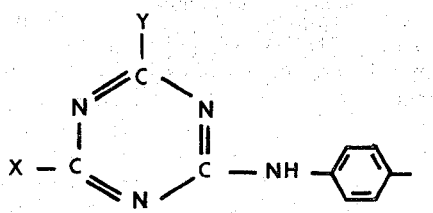 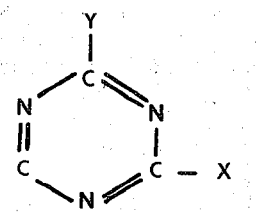   III

Table 1

| Substituent X | Y | M.P.°C. | Appearance |
|---|---|---|---|
| —Cl | —NH₂ | >320 | white crystals |
| —Cl | —NHC₂H₅ | >320 | white crystals |
| —Cl | —NHC₃H₇—i | 226 – 228 | white crystals |
| —Cl | —NHC₄H₉—n | 208 – 210 | white crystals |
| —Cl | —NHC₄H₉—t | 183 – 185 | white crystals |
| —Cl | —NH—CH₂—CH=CH₂ | >320 | white crystals |
| —Cl | —N(CH₂—CH=CH₂)₂ | 213 – 214 | white crystals |
| —Cl | —NH—CH—CH₂—CH(CH₃)₂ (with CH₃) | 148 – 150 | white crystals |
| —Cl | —NH—C₆H₁₁ | >330 | white crystals |
| —Cl | —N(morpholino) | >330 | white crystals |
| —OCH₃ | —NHCH₂ CH=CH₂ | 216 – 218 | white crystals |
| —SC₈H₁₇ | —NH—CH—CH₂—CH(CH₃)₂ (with CH₃) | | yellow oil |
| —Cl | —NH—CH₂—CH₂—OH | >330 | white crystals |
| —Cl | —N(CH₂—CH₂—OH)₂ | >330 | white crystals |
| —Cl | —NH—CH₂—C₆H₅ | >330 | white crystals |
| —Cl | —N(C₂H₅)₂ | 274 – 276 | white crystals |
| —Cl | —NH—CH₂CH₂CH₂OCH₃ | 210 – 212 | white crystals |
| —Cl | —NH—C₈H₁₇—n | 182 – 183 | white crystals |
| —SC₈H₁₇ | —NH—CH(CH₃)₂ | 85 – 87 | light yellow crystals |
| —SC₁₂H₂₅ | —NH—CH₂—CH=CH₂ | 90 – 92 | light yellow crystals |
| —OCH₂—CH=CH₂ | —OCH₂—CH=CH₂ | >330 | white crystals |
| —Cl | —OCH₂CH=CH₂ | >330 | white crystals |

(b) Compounds of the general formula I as set forth in Table 2

| Substituent X | Y | Z | M.P.°C. | Appearance |
|---|---|---|---|---|
| —Cl | —NH₂ | —C₆H₅ | 215 | white crystals |
| —Cl | —NH—CH₂—CH=CH₂ | —C₆H₅ | 195 – 196 | white crystals |
| —Cl | —NH—C₃H₇—i | —C₆H₅ | 142 – 144 | white crystals |
| —Cl | —NH—CH(CH₃)—CH₂—C₃H₇—i | —C₆H₅ | 139 – 140 | white crystals |
| —Cl | —NH—C₃H₇—i | —CH(CH₃)—CH₂—CH(CH₃)₂ | >330 | red crystals |
| —Cl | —NH—CH₂—CH=CH₂ | —CH(CH₃)—CH₂—CH(CH₃)₂ | 280 – 281 | light brown crystals |
| —SCH₃ | —NH—C₃H₇—i | —C₆H₅ | 93 – 95 | light yellow crystals |
| —SC₈H₁₇ | —NH—C₃H₇—i | —C₆H₅ | | oil |
| —NH—C₃H₇—i | —NH—C₃H₇—i | —C₆H₅ | 184 – 186 | white crystals |
| —OCH₃ | —NH—C₃H₇—i | —C₆H₅ | 112 – 113 | white crystals |

Further representative triazine compound according to the invention are: N,N'-bis-(4,6-diamino-1,3,5-triazinyl-2) -p-phenylenediamine, N,N'-bis-(4,6-bis-mono- or -dimethylamino, diethylamino-, dipropylamino- etc. up to -didodecylamino-1,3,5-triazinyl-2)-p-phenylenediamine, N,N'-bis-(4-chloro-6-mono- or -dimethylamino-, -diethylamino-, -dipropylamino- etc. up to -dioctadecylamino-1,3,5-triazinyl-2)-p-phenylenediamine, N,N'-bis-(4-chloro-6-α-or -β-naphthylamino-1,3,5-triazinyl-2)-p-phenylenediamine, N,N'-bis-(4-mono- or di-allylamino- or -methallyl amino-6-α-or -β- naphthylamino-1,3,5-triazinyl-2)-p-phenylenediamine, N,N'-bis-(4-methylthio-,ethylthio-, -n-propylthio-, -i-propylthio-etc. up to -dodecylthio-6-α-or -β-naphthylamino-1, 3,5-triazinyl-2)-p-phenylenediamine, N,N'-bis-(—4-amino-6-α-or -β-naphthylamino-1,3,5-triazinyl-2) P-phenylenediamine, N-methyl-, N-ethyl-, N-phenyl-, N-benzoyl-, N-benzyl- or N-acetyl-N'-(4-chloro-6-α-or -β-naphthylamino-1,3,5-triazinyl-2)-p-phenylenediamine, N-(4-allylamino-6-α- or -β-naphthylamino-1,3,5-triazinyl-2)-p-phenylenediamine, N-(4-chloro-6-α-or -β-naphthylamino -1,3,5-triazinyl-2)-p-phenylenediamine, N-methyl-, N-ethyl-, N-phenyl-, N-benzoyl-, N-benzyl- or N-acetyl-N'-(4-allylamino-6-α- or -β-naphthylamino-1,3,5-triazinyl-2)-p-phenylenediamine, N-methyl-, N-ethyl-, N-phenyl-, N-benzoyl-, N-benzyl- or N-acetyl-N'-(4-amino-6-α- or -β-naphthylamino-1,3,5-triazinyl-2)-p-phenylenediamine, N,N'-bis-(4-chloro-6-mono- or -di-3-cyanopropyl-amino-1,3,5-triazinyl-2)-p-phenylenediamine, N,N'-bis-[4,6-bis-(mono- or -di-3-cyanopropyl-amino)-1,3,5-triazinyl-2]-p-phenylenediamine, N,N'-bis-(4-chloro-6-mono- or dihydroxymethyl-, -di-2-hydroxyethyl-, -di-3-hydroxypropyl-, -di-4-hydroxybutyl- etc., up to -18-hydroxyoctadecyl-amino-1,3,5-triazinyl-2) -p-phenylenediamine, N,N'-bis-[4,6-bis-(mono- or -dihydroxymethyl-, -di-2-hydroxyethyl-, -di-3-hydroxypropyl- etc. up to -18-hydroxyoctadecyl-amino)-1,3,5-triazinyl-2]-p-phenylenediamine, N,N'-bis-[4-chloro-6-mono- or -bis-(1,4-dihydroxy-n-butyl)-amino-1,3,5-triazinyl-2]-p-phenylenediamine, N,N'-bis-{4,6-bis-[mono- or -bis-(1,4-dihydroxy-n-butyl-, -1,6-dihydroxy-n-hexyl- or -1,2,3-trihydroxypropyl)-amino]-1,3,5-triazinyl-2}-p-phenylenediamine, N,N'-bis- [4-chloro-6-mono- or bis-(methoxyethyl)-, -(3-methoxypropyl)-, -(3-ethoxypropyl)-, -(4-methoxy-n-butyl)-, -(4-ethoxy-n-butyl)-, -(4-propoxy-n-butyl)-, -(6-methoxy-n-hexyl)-, -(6-ethoxy-n-hexyl)-, -(6-propoxy-n-hexyl)-, -(6-butoxy-n-hexyl)-, -(3-dodecyloxy-propyl)-, -(3-octadecyloxy-propyl)-(6-pentoxy-n-hexyl)-, etc. up to -(12-methoxydodecyl)-amino-1,3,5-triazinyl- 2]-p-phenylenediamine, N,N'-bis-{4,6-bis-[mono- or -bis-(methoxymethyl)-, -(3-methoxypropyl)-, -(3-ethoxypropyl)-, -(4-methoxy-n-butyl)-, -(4-ethoxy-n-butyl)-, -(4-propoxy-n-butyl)-, -(6-methoxy-n-hexyl)-, -(6-ethoxy-n-hexyl)-, -(6-propoxy-n-hexyl)-, -(6-butoxy-n-hexyl)-, -(6-pentoxy-n-hexyl)-, etc. up to -(12-methoxydodecyl)-amino]-1,3,5-triazinyl-2}-p-phenylenediamine, N,N'-bis-(4-chloro-6-methylthio-, -ethylthio-, n-propylthio-, -i-propylthio-, -n-butylthio-, -i-butylthio- etc. up to -dodecylthio-1,3,5-triazinyl-2)-p-phenylenediamine, N,N'-bis- [4,6-bis-(methylthio)-1,3,5-triazinyl-2]-p-phenylenediamine, N,N'-bis- [4,6-bis-(ethylthio)-, -(n-propylthio)-]-(i-propylthio)-, -(n-butylthio)-, -(i-butylthio)- etc. up to -(dodecylthio)- 1,3,5-triazinyl-2)-p-phenylenediamine, N,N'-bis-(4-methylthio-, -ethylthio-, -n-propylthio-, -i-propylthio-, -n-butylthio-, -i-butylthio- etc. up to -dodecylthio-6-mono- or -dimethyl-, diethyl-, diallyl-, dimethallyl-, -dipropyl-, -dibutyl-, -di-i-propyl-, di-i-butyl- etc. up to -didodecyl-, -di-3-methoxypropyl-, -di-3-cyanopropyl-, di-3-hydroxypropyl-amino-1,3,5-triazinyl-2-)-p-phenylenediamine, N,N'-bis-(4-chloro-6-methoxy-, -ethoxy-, -n-propoxy-, -i-propoxy-, n-butoxy-, -i-butoxy- etc. up to -dodecyloxy-1,3,5-triazinyl-2) -p-phenylenediamine, N,N'-bis-(4,6-dimethoxy-, -diethoxy-, -di-ni-propoxy-, -di-i-propoxy, -di-n-butoxy-, di-i-butoxy- etc. up to -di-dodecyloxy-1,3,5-triazinyl-2-)-p-phenylenediamine, N,N'-bis-(4-chloro-6-allyloxy- or -6-methallyloxy- or -6-cyclopentyloxy- or -6-cyclohexyloxy-1,3,5-triazinyl-2)-p-phenylenediamine, N,N'-bis-(4,6-diallyloxy-, -dimethallyloxy-, -dicyclopentyloxyl-, dicyclohexyloxy-, -dicycloheptyloxy- or -dicyclooctyloxy-1,3,5-triazinyl-2)-p-phenylenediamine, N,N'-bis-(4-methoxy-, -ethoxy-, n-propoxy-, -i-propoxy-, -n-butoxy-, -i-butoxy- etc. up to -dodecyloxy- as well as -allyloxy-, -methallyloxy-, -cyclopentyloxy-, -cyclohexyloxy-, -cyclooctyloxy-6-methylthio-, -ethylthio-, -n-propylthio-, -i-propylthio-, -n-butylthio-, -i-butylthio- etc. up to -dodecylthio-1,3,5-triazinyl-2)-p-phenylenediamine, N,N'-bis-(4-chloro-6-morpholino-, -6-piperidino-, 6-pyrrolidino- or -6-thiamorpholino-1,3,5-triazinyl-2-)-p-phenylenediamine, N,N'-bis-(4,6-bis-morpholino-, -piperidino-, -pyrrolidino-, or -thiamorpholino-1,3,5-triazinyl-2)-p-phenylenediamine, N,N'-bis-(4-mono- or -dimethylamino-, -diethylamino-, -di-n-propylamino-, -di-i-propylamino-, -di-n-butylamino-, -di-i-butylamino- etc. up to -didodecylamino- as well as 4-mono- or -diallylamino-, -dimethallylamino-, -dicyclopentylamino-, dicyclohexylamono-, -di-3-cyanopropylamino-, -di-3-methoxypropylamino-, -di-3-hydroxypropylamino- or -bis-1,4-dihydroxydibutylamino-6-methylthio-, ethylthio-, -n-propylthio-, -i-propylthio-, n-butylthio-, -i-butylthio- etc. up to -dodecylthio-1,3,5-triazinyl-2)-p-phenylenediamine N,N'-bis-(4-chloro-6-diallylamino- cr -6-dimethallylamino-1,3,5-triazinyl-2)-p-phenylenediamine, N,N'-bis-(4-chloro-6-allylamino- or -methallylamino-1,3,5-triazinyl-2)-p-phenylenediamine, N,N'-bis-(4-chloro-6-mono- or -dicyclohexylamino-1,3,5-triazinyl-2)-p-phenylenediamine, N,N'-bis- [4,6-bis-(mono- or -diallyl, -dimethallyl- or -dicyclohexylamino)-1,3,5-triazinyl-2] -p-phenylenediamine.

These and the following enumerated compounds as well as those disclosed in both of the above tables are illustrative of compounds of the invention but are not limiting:

N-methyl- or N-phenyl- or N-benzoyl-N'-(4-chloro-6-mono- or dimethylamino-, -diethylamino-, -di-n-propylamino-, -di-i-propylamino-, -di-n-butylamino, -di-i-butylamino- etc. up to -dioctadecylamino-1,3,5-triazinyl-2)-p-phenylenediamine, N-(4-chloro-6-mono- or -dimethylamino-, -diethylamino-, -di-n-propylamino-, -di-i-propylamino-, -di-n-butylamino-, -di-i-butylamino- etc. up to -didodecylamino-1,3,5-triazinyl-2)-p-phenylenediamine, N-methyl- or N-phenyl- or N-benzoyl-N'-(4-chloro-6-allylamino-1,3,5-triazinyl-2)-p-phenylenediamine, N-(4-chloro-6-allylamino-1,3,5-triazinyl-2)-p-phenylenediamine, N-methyl- or N-phenyl- or N-benzoyl-N-(4-chloro-6-mono- or -diallylamino, dimethallylamino-, -dicyclopentylamino-, -dicyclohexylamino- or -cyclooctylamino-1,3,5-triazinyl-2)-p-phenylenediamine, N-(4-chloro-6-mono or -diallylamino-, -dimethallylamino-, -dicyclopentylamino-, -di-cyclohenxylamino- or -dicyclooctylamino-1,3,5-triazinyl-2)-p-phenylenediamine, N-acetyl-, N-propionyl-, N-butyryl-, N-pentanoyl- etc. up to N-nonadecanoyl-N'-(4-cloro-6-mono- or -dimethylamino-, -diethylamino-, -di-n-propylamino-, -di-i-propylamino-, -di-n-butylamino-, -di-i-butylamino- etc. up to -didodecylamino-1,3,5-triazinyl-2)-p-phenylenediamine, N-methyl-, N-ethyl-, N-i-propyl-, N-n-propyl, N-phenyl-, N-benzoyl- or N-nenzyl-N'-[4,6-bis-mono- or -dimethyl-, -diethyl-, -di-n-propyl-, -diallyl-, -dimethallyl-, -dicyclohexyl-, -di-3-cyanopropyl-, -di-3-methoxypropyl-, -di-3-hydroxypropyl-, -di-n-butyl-, -di-i-butyl- etc. up to -di-octadecylamino)-1,3,5-triazinyl-2] -p-phenylenediamine, N-acetyl-, N-propionyl-, N-butyryl-, N-pentanoyl- etc. up to N-nonadecanoyl-N'- [4,6-bis-(mono- or -dimethyl-, -diethyl-, di-n-propyl-, -di-i-propyl-, -diallyl-, -dimethallyl-, -dicyclohexyl-, -di-3-cyanopropyl-, -di-3-methoxypropyl-, -di-3-hydroxypropyl-, -di-n-butyl-,-di-i-butyl- etc. up to -di-dodecylamino- 1,3,5-triazinyl-2] -p-phenylenediamine, N- [4,6-bis-(mono- or -dimethyl-, -diethyl-, -di-n-propyl-, -di-i-propyl-, -diallyl-, -dimethallyl-, -dicyclohexyl-, -di-3-cyanopropyl-, -di-3-methoxypropyl-, -di-3-hydroxypropyl-, -di-n-butyl-, -di-i-butyl- etc. up to -di-dodecylamino)- 1,3,5-triazinyl-2] -p-phenylenediamine, N-methyl-, N-ethyl-, N-phenyl-, N-benzyl- or N-benzoyl-N'-(4-mono- or -dimethylamino-, -diethylamino-, -di-n-propylamino-, -di-i-propylamino- etc. up to -didodecylamino- as well as -diallylamino-, -dimethyallylamino-, -di-cyclopentylamino-, -dicyclohexylamino- or -cyclooctylamino-6-methylthio-, -ethylthio-, -n-propylthio-, -i-propylthio- etc. up to -dodecylthio-1,3,5-triazinyl-2)-p-phenylenediamine, N-acetyl-, N-propionyl-, N-butyrl-, N-pentanoyl- etc. up to N-nonadecanoyl-N'-(4-mono- or -dimethylamino-, -diethylamino-, -di-n-propylamino-, -di-i-propylamino- etc. up to -di-dodecylamino- as well as -diallylamino-, -dimethallylamino-, -di-cyclopentylamino-, -dicyclhexylamino- or -cyclooctylamino-6-methylthio-,-ethylthio-, -n-propylthio-, -i-propylthio- etc. up to -dodecylthio-1,3,5-triazinyl-2)-p-phenylenediamine, N-(4-mono- or -dimethylamino-, -diethylamino-, -di-n-propylamino-, di-i-propylamino- etc. up to -di-dodecylamino- as well as -diallylamino-, -dimethallylamino-, -di-cyclopentylamino-, -dicyclohexylamino- or -cyclooctylamino-6-methylthio-, -ethylthio-, -n-propylthio-, -i-propylthio- etc. up to-dodecylthio-1, 3,5-triazinyl-2)-p-phenylenediamine, N-methyl-, N-ethyl-, N-i-propyl-, N-n-propyl- etc. up to octyl- as well as N-phenyl-, N-benzyl or N-benzoyl- or N-cyclohexyl-N'-(4,6-dimethylthio-, -diethylthio-, -di-n-propylthio-, -di-i-propylthio- etc up to -di-dodecylthio-1,3,5-triazinyl-2)-p-phenylenediamine, N-(4,6-dimethylthio-, -diethylthio-, -di-n-propylthio-, -di-i-propylthio- etc. up to -di-dodecylthio-1,3,5-triazinyl-2)-p-phenylenediamine, N-methyl-, N-ethyl-, N-i-propyl-, N-n-propyl- etc. up to N-octyl- as well as N-phenyl-, N-benzyl-, N-benzoyl- or N-cyclohexyl-N'-(4-chloro-6-methoxy-, ethoxy-, -n-propoxy-, -i-propoxy-, -n-butoxy-, -i-butoxy- etc. up to -dodecyloxy-1, 3,5-triazinyl-2)-p-phenylenediamine, N-(4-chloro-6-methoxy-, -ethoxy-, -n-propoxy-, -i-propoxy-, -n-butoxy-, -i-butoxy- etc. up to -dodecyloxy-1,3,5-triazinyl-2)-p-phenylenediamine, N-methyl-, N-ethyl, N-i-propyl-, N-n-propyl- etc. up to N-octyl- as well as N-phenyl-, N-benzyl-, N-benzoyl- or N-cyclohexyl-, N'-(4-chloro6-allyloxy- or -6-methallyloxy- or -6-cyclopentyloxy- or -6-cyclohexyloxy-1,3,5-triazinyl-2)-p-phenylenediamine, N-methyl-, N-ethyl-, N-i-propyl-, N-n-propyl- etc. up to N-octyl- as well as N-phenyl-, N-benzyl-, N-benzoyl- or N-cyclohexyl- N'-(4-methoxy-, -ethoxy-, -n-propoxy-, -i-propoxy-, -n-butoxy-, -i-butoxy- etc. up to -dodecyloxy-as well as -allyloxy-, -metallyloxy-, -cyclopentyloxy-, -cyclohexyloxy-, -cyclooctyloxy-6-methylthio-, -ethylthio-, -n-propylthio-, -i-propylthio-, -n-butylthio-, -i-butylthio- etc. up to -dodecylthio-1,3,5-triazinyl-2)-p-phenylenediamine, N-methyl-, -N-ethyl-, N-i-propyl-, N-n-propyl- etc. up to N-octyl-, as well as N-phenyl-, N-benzyl-, N-benzoyl- or N-cyclohexyl-, N'-(4-chloro-6-morpholino-, -6-piperidino-, -6-pyrollidino-, or -6-thiamorpholino-1,3,5-triazinyl-2)-p-phenylenediamine.

Unless otherwise indicated all parts and percentages are by weight.

Examples 1-6 below illustrate methods of preparation of the compounds of the invention.

EXAMPLE 1

There were dissolved 369 grams of cyanuric chloride in 1500 ml acetone and this solution was poured with strong stirring on 1000 grams of finely divided ice. There were dropped on this dispersion at −10°C. a solution of 108 grams of p-phenylenediamine in 2 liters of acetone and subsequently a solution of 80 grams of NaOH in 200 ml of water at the same temperature. Now the cooling medium was removed and there was added dropwise again with stirring 114 grams of allylamine and later a solution of 80 grams of NaOH in 200 ml of water. The temperature at the end of the reaction was 45° to 50°C. After stirring for 30 minutes the mixture tested neutral, and was poured on 3 liters of water, the mixture filtered with suction, the reaction product washed with water and dried at 100°C. in a vacuum.

There resulted 433.5 grams of bis-N,N'-(4-allylamino -6-chloro-1,3,5-triazin -2-yl)-p-phenylenediamine, a white powder having a melting point higher than 300°C. The yield was 97.5% of theory.

EXAMPLE 2

444.5 grams of bis-N,N'-(4-allyl-amino-6-chloro-1,3,5-triazin -2-yl)-p-phenylenediamine were introduced into a solution of 108 grams of sodium methylate in 2 liters of methanol and the mixture subsequently heated for 6 hours under reflux. The mixture then tested neutral, and was poured on 4 liters of water and the white precipitate formed was filtered with suction. The washing and drying of this precipitate took place at 80 to 90°C. in a vacuum. There was obtained the bis-N,N'-(4-allylamino-6-methoxy-1,3,5-triazin-2-yl)-p-phenylenediamine having a melting point of 216° to 218°C. with a yield of 96.5% of theory (421.2 grams).

EXAMPLE 3

There were placed in a 4 liter round flask equipped with a stirrer 2 liters of toluene and 255 grams of allyl alcohol. There were then introduced with heating in all 92 grams of sodium. The mixture was heated until the metal disappeared and then was cooled to 40°C. Then there were introduced 445 grams of solid bis- N,N'-(4,6-dichloro-1,3,5-triazin-2-yl)-p-phenylenediamine and the mixture boiled at reflux until the mixture reacted neutral, was cooled somewhat, filtered and the filtrate evaporated in a vacuum. Thereby there was formed 417.1 grams of bis-N,N'-(4,6-diallyloxy-1,3,5-triazin-2-yl)-p-phenylenediamine having a melting point of > 330°C. and a yield of 85.3% of theory.

The bis-N,N'-(4,6-dichloro-1,3,5-triazin-2-yl)-p-phenylenediamine employed in this example was prepared in the manner of example 1 prior to adding the allylamine.

EXAMPLE 4

445 grams of bis-N,N'-(4-allylamine-6-chloro-1,3,5-triazin-2-yl)-p-phenylenediamine were introduced into a solution of 340 grams of sodium octyl mercaptide in 2 liters of methanol, 10 grams of trimethylamine dissolved in 100 ml of methyl alcohol were added and the mixture stirred for 8 hours at 45° to 50°C. Subsequently the product was neutralized with dilute hydrochloric acid and poured into 6 liters of water. The white precipitate formed was filtered off with suction, washed and dried in a vacuum at 70°C.

There were obtained 491.3 grams of bis-N,N'-(4-allylamino-6-octylmercapto-1,3,5-triazin-2-yl)-p-phenylenediamine having a melting point of 85°–87°C. in a yield of 91.1% of theory.

EXAMPLE 5

184.5 grams of cyanuric chloride were dissolved in 1 liter of acetone and the solution poured with stirring into 1 liter of ice water. Then there was dropped in at −10°C. a solution of 185 grams of N-phenyl-p-phenylenediamine dissolved in 800 ml of acetone and subsequently there was added a solution of 40.1 grams of NaOH in 200 ml of water.

Then there were dropped in fairly rapidly 200 grams of a 40% aqueous isopropylamine solution and the temperature allowed to rise to 45°C. The mixture quickly became neutral. The mixture was then poured into 3 liters of water, the reaction product filtered off with suction, washed with water and dried in a vacuum. The product was in the form of white crystals melting at 142° to 144°C. The yield of the N-phenyl-N'-(4-chloro-6-isopropylamino-1,3,5-triazin-2-yl)-p-phenylenediamine was 337.9 grams which was 95.3% of theory.

EXAMPLE 6

354.5 grams of N-phenyl-N'-(4-chloro-6-isopropylamino -1,3,5-triazin-2-yl)-p-phenylenediamine was placed in an autoclave together with 200 grams of a 70% aqueous isopropylamine solution and 1 liter of dioxane, the autoclave closed and heated for 6 hours at 140°C. After working up as in example 5 there were recovered 359.1 grams of N-phenyl-N'-(4,6-bis-isopropylamine-1, 3,5-triazin-2-yl)-p-phenylenediamine. It was in the form of white crystals having a melting point of 184° to 186°C. The yield was 82.2% of theory.

The new phenylenediamine substituted triazines can be used advantageously in the rubber processing or elastomer industry as highly effective non-discoloring or only very slightly coloring anti-ageing or fatigue protective agents.

A further purpose of the invention is the development of a process for the stabilization of vulcanized or vulcanizable rubber containing mixtures which in a given case contain fillers, which process is characterized by the inclusion of at least one 1,3,5-triazine of formula I as the stabilizing agent.

As rubbers or elastomers there can be used all cross-linkable natural and synthetic rubbers or their mixtures which can be vulcanized or cross-linked, for example, with sulfur or sulfur donors (as, for example, N,N'-dithio-bismorpholine, dipentamethylenethiuramtetrasulfide, N,N'-dithiobishexahydro-2H-azepinone-(2), and 2-benzothiazylditho-β-morpholide) and known vulcanized accelerator systems, in a given case in the presence of fillers. As stated any conventional sulfur donor can be used. As examples of rubbers suitable for use in the invention there are preferably used natural rubber (NR), homo and copolymers of conjugated dienes, e.g., butadiene-styrene rubber (SBR), nitrile rubber, i.e. butadiene-acrylonitrile copolymer (NBR), polybutadiene (BR), polyisoprene (IR), polychoroprene (CR), known polymers of two olefins and in a given case a polyene hydrocarbon, especially diene hydrocarbons and trans-polypentencamers (see Zeitschrift Kautschuk and Gummi, Kunstoffe, Vol. 23, pages 502 et seq. (1970). The invention includes the use of blends of several of the named types of rubber or elastomers.

Further butadiene copolymers which may be used in the invention are such as butadiene-acrylic acid ester copolymers, e.g. butadiene-2-ethylhexyl acrylate copolymer, butadiene-methyl methacrylate copolymer, butadiene-vinylpyridine copolymer, butadiene-alkylvinyl-pyridine copolymer, e.g. butadiene-2-vinyl-5-methylpyridine copolymer; furthermore ethylene-propylene terpolymers, e.g. ethylene-propylene-dicyclopentadiene terpolymer, ethylene-propylene-norbornadiene terpolymer, ethylene-propylenecyclooctadiene terpolymer and ethylene-propylene-cyclododecatriene terpolymers and butyl rubber (isobutylene-butadiene copolymer).

In a given case there can also be employed as cross-linking agents for appropriate rubbers and rubber mixtures di-valent metal oxides such as, for example, magnesium oxide, zinc oxide or lead oxide.

As accelerators for the vulcanization with sulfur there can be used alone or in combination known agents such as benzothiazoles (for example 2-mercaptobenzothiazole, dibenzothiazyl disulfide and the sulfenamide of 2-mercaptobenzothiazole), diphenyl guanidine, 2-mercaptoimidazoline, mercaptotriazines(for example mono and dimercaptotriazine or their sulfenamides),disulfides or polysulfides,(e.g. trisulfides and tetrasulfides), thiurams (for example tetraalkylthiuram mono or disulfides, e.g. tetramethyl thiuram monosulfide and disulfide). The thiuram accelerators are especially very suitable in those cases in which a vulcanization retarding activity occurs in order to regulate the speed of vulcanization to the desired value.

Sulfur, sulfur donors, accelerators and in a given case fillers are added to the conventional amount to the composition to be vulcanized. Thus 0.2 to 4 parts of sulfur or the equivalent amount of sulfur donor can be used. The vulcanization is carried out at customary temperatures of about 100 to about 300°C., especially 120° to 240°C. for customary times, e.g. 15 minutes to 2 hours, usually between 15 and 30 minutes. There can be used any of the conventional industrial processes and apparatus for this purpose, for example, heating with superheated steam, hot air, in salt baths, fluidized beds, with ultra high frequency rays and steam tubes.

The accelerators or accelerator combinations can be added together with zinc oxide and/or stearic acid.

The invention includes the use of 1,3,5-triazines of formula I for the stabilization of vulcanizates prepared from vulcanizable rubber containing mixtures. In a given case the novel stabilizers can be used in combination with known stabilizers or anti-agers. Examples of the latter materials have been set forth above.

It is further a purpose of the invention to develop a vulcanizable mixture from at least ine elastomer, sulfur and/or a sulfur donor as well as at least one vulcanization accelerator or at least one oxide of a divalent metal (such as those set forth above), in a given case at least one filler and in a given case other additives known in the rubber processing industry containing at least one 1,3,5-triazine of formula I, in a given case in combination with known stabilizers or anti-ageing agent. These mixtures can be vulcanized or cross-linked and shaped.

There can be added to the starting mixtures all of the customary additives such as plasticizers, mineral oils, viscosity increasing agents, accelerators, activators such as stearic acid and in a given case zinc oxide, waxes, expanding agents, dyes, special protecting agents against ozone and pigments.

There can also be worked into the vulcanizable mixtures all kinds of blacks used in the rubber working industries as well as finely divided silica, especially silica produced in the gas phase or by precipitation from aqueous alkali metal silicate solutions, as well as silica and silicates which have been rendered hydrophobic. Additionally there can be included finely divided metal oxides including mixed oxides and mixtures of oxides; furthermore in a given case artificial and natural chalks, clays, siliceous chalk and the like can be added.

The new stabilizing agents are generally used in an amount of 0.05 to 10 parts, preferably 0.1 to 5 parts, per 100 parts by weight of polymer. The new stabilizers can be used alone or mixtures of 2 or more of them can be employed. They can also be used in combination with known antioxidants or antiagers. Such materials include, for example, phenyl-α-naphthylamine (PAN), phenyl-β-naphthylamine (PBN), N-phenyl-N'-cyclohexyl-p-phenylenediamine, N-phenyl-N'-isopropyl-p-phenylene diamine, N-(1,3-dimethylbutyl)-N-phenyl-p-phenylenediamine, 6-ethoxy-1,2-dihydro-2,2,4-trimethylquinoline, 2,6-di-tert.-butyl -p-cresol, 4,4'-dihydroxydiphenyl as well as the materials set forth earlier. These additives can be used individually or in mixture of several of them.

When at least one compound of formula I is added to the rubber mixture, this compound acts as a stabilizer in the corresponding vulcanizate and imports a high protection against fatigue in dynamic stress and against ageing, especially at high temperature. Furthermore, these anti-ageing materials have the advantage not previously attained of non-discoloration of the vulcanizates produced therewith when subjected to the influence of light or provide an excellent protection against light in combination with high protection against fatigue.

These facts are illustrated in the following examples.

EXAMPLE I

The following vulcanizates were prepared and tested using eight different stabilizers of the invention and in comparison a known good anti-ager:

| Composition | Parts by weight |
|---|---|
| Oil-extended styrene-butadiene rubber containing 23.5% styrene and 27.5% of highly aromatic hydrocarbon extender oil (Buna Huls 1712) | 96.5 |
| cis-polybutadiene rubber (Buma CB 10) | 30.0 |
| HAF carbon black N 330 (Corax 3 of Degussa) | 75.0 |
| stearic acid | 1.2 |
| zinc oxide | 4.0 |
| highly aromatic hydrocarbon as a plasticizer (Naftolen ZD) | 15.0 |
| stabilizer (as set forth below) | 3.0 |
| benzothiazyl-2-cyclohexylsulfenamide | 1.2 |
| sulfur | 1.6 |

The following stabilizer of the invention were added in the amount indicated in the above formula:

| Code | Chemical Designation |
|---|---|
| IN 61 | bis-(4-chloro-6-anilinotriazin-2-yl)-p-phenylenediamine |
| IN 58 | bis-(4-chloro-6-ethylamino-triazin-2-yl)-p-phenylenediamine |
| IN 63 | bis-(4-chloro-6-diallylamino-triazin-2-yl)-p-phenylenediamine |
| IN 62 | bis-(4-chloro-6-n-butylamino-triazin-2-yl)-p-phenylenediamine |
| IN 59 | bis-(4-chloro-6-allylamino-triazin-2-yl)-p-phenylenediamine |
| IN 72 | bis-(4-chloro-6-isopropylamino-triazin-2-yl)-p-phenylenediamine |
| IN 71 | bis-(4-chloro-6-[1,3-dimethylbutylamino]-triazin-2-yl)-p-phenylenediamine |
| IN 70 | bis-(4-chloro-6-α-naphthylamino-triazin-2-yl)-p-phenylenediamine |

The comparison was with the best known anti-aging agent based on p-phenylenediamine:

| Code | Chemical Designation |
|---|---|
| IPPD | N-isopropyl-N'-phenyl-p-phenylenediamine |

The comparative testing of the growth of cracks in the bend test of De Mattia was carried out after vulcanization at 160°C. to optimum cure, first without ageing. The named test of bending fatigue or crack formation of the test samples is described in the DIN (German Industrial Standards) Standard 53,522 sheet 3 and corresponds to ASTM D 813/1965 or the draft ISO-Recommendation No. 173. There was measured the number of bends of the test samples which were necessary to produce a growth of the cracks formed from 4 to 8 mm in length. The measured number of bends of the samples which contained IN stabilizers was set up in ratio to the number of bends of the test sample which contained the known anti-ageing agent IPPD. This ratio of the number of bends of IN per bend of IPPD was as follows:

| IN 61 | to IPPD | 1.2 to 1 |
| IN 58 | to IPPD | 2.0 to 1 |
| IN 63 | to IPPD | 2.2 to 1 |
| IN 62 | to IPPD | 5.1 to 1 |
| IN 59 | to IPPD | 16.5 to 1 |
| IN 72 | to IPPD | 2.4 to 1 |
| IN 71 | to IPPD | 4.7 to 1 |
| IN 70 | to IPPD | 4.8 to 1 |

The vulcanized test samples were aged for several days at 100°C. in a heat chest and then the above described bending fatigue test of De Mattia carried out. The results are set forth in the following table:

| Number of days of aging at 100°C. | 2 | 4 | 6 |
|---|---|---|---|
| IN 61 to IPPD | 0.9 | 0.9 | 1.2 |
| IN 58 to IPPD | 0.9 | 1.8 | 2.6 |
| IN 63 to IPPD | 2.8 | 3.0 | 4.9 |
| IN 62 to IPPD | 2.8 | 3.3 | 3.4 |
| IN 59 to IPPD | 2.0 | 2.9 | 5.1 |
| IN 72 to IPPD | 1.9 | 2.5 | 4.0 |
| IN 71 to IPPD | 1.8 | 1.9 | 2.8 |
| IN 70 to IPPD | 1.7 | 1.9 | 2.4 |

From these figures there is evident in part the considerably superior activity of the light tested stabilizers of the invention in comparison to the previously most effective known p-phenylenediamine derivative in the rubber industry. In the unaged condition of the vulcanizate compounds IN 58, IN 59, IN 62, IN 63, IN 72, IN 71 and IN 70 already produces double or more the fatigue protection of the named IPPD. When the samples were subjected to ageing at higher temperatures, the fatigue protection remains with the effect of the IN stabilization obtained.

EXAMPLE II

Stabilizers IN 61, IN 58, IN 63, IN 62, IN 59, IN 72, IN 71 and IN 70 of the invention as well as IPPD were worked into the same rubber mixture as in example I and test samples produced by vulcanizing at 160°C. as in example I. After 8 days hot air ageing of the vulcanizate at 100°C. there were produced the following changes in the measured values of tensile strength (TS) in %, the 200% modulus ($\sigma$ 200) in %, the elongation at break (BD) in % and the Shore - A - Hardness (SH)

in points comparison to the starting values of the test samples in unaged condition:

| Sample | TS | σ 200 | BD | SH |
|---|---|---|---|---|
| IPPD | −20 | +212 | −57 | +13 |
| IN 61 | − 5 | +103 | −39 | + 5 |
| IN 58 | −13 | +136 | −47 | + 5 |
| IN 63 | −12 | + 87 | −44 | + 7 |
| IN 62 | −10 | +170 | −52 | + 7 |
| IN 59 | +13 | +120 | −31 | + 6 |
| IN 72 | −27 | +156 | −57 | + 9 |
| IN 71 | −31 | +149 | −58 | + 8 |
| IN 70 | −10 | +170 | −48 | +10 |

The determinations were made according to DIN standards 53,504 and 53,505.

From the comparison values the following advantages can be recognized. By a suitable choice of stabilizer according to formula I the increase in Shore hardness under the effect of hot air can be reduced to above half the increase in the presence of IPPD. The simultaneous lesser increase in 200% modulus shows that the vulcanizate using the p-phenylenediamino substituted triazines has substantially less increase in hardness under the effect of heat and oxygen than in protection by IPPD. The reduction of hardening is sought at great expense in the rubber article and tire industries, since the hardening leads to a reduction in the life of the rubber articles.

Compounds according to the invention which have only one triazine ring (see formula I) likewise possess excellent properties as fatigue and age protecting agents.

In the following examples the following IN stabilizers were tested:

| Code | Chemical Designation |
|---|---|
| IN 73 | N-phenyl-N'-(4-chloro-6-amino-1,3,5-triazin-2-yl)-p-phenylenediamine |
| IN 74 | N-phenyl-N'-(4-chloro-6-allylamino-1,3,5-triazin-2-yl)-p-phenylenediamine |
| IN 75 | N-phenyl-N'-(4-chloro-6-i-propylamino-1,3,5-triazin-2-yl)-p-phenylenediamine |
| IN 76 | N-phenyl-N'-(4-chloro-6-(1,3-dimethylbutylamino)-1,3,5-triazin-2-yl)-p-phenylenediamine |

EXAMPLE III

Test samples were prepared using the recipe described in example I and employed in IN 73, IN 74, IN 75 and IN 76 in the same procedure. Tests of fatigue according to the De Mattia procedure were carried out. The following ratios of IN to IPPD were obtained without ageing:

| | |
|---|---|
| IN 73 to IPPD | 17.8 to 1 |
| IN 74 to IPPD | 4.4 to 1 |
| IN 75 to IPPD | 3.2 to 1 |
| IN 76 to IPPD | 2.9 to 1 |

After ageing of the test samples in hot air at 100°C. at times up to 6 days the following ratios were obtained:

| Number of Days of Ageing | 2 | 4 | 6 |
|---|---|---|---|
| IN 73 to IPPD | 2.9 | 2.7 | 3.1 |
| IN 74 to IPPD | 2.7 | 2.9 | 3.5 |
| IN 75 to IPPD | 2.0 | 1.9 | 1.9 |
| In 76 to IPPD | 1.9 | 1.7 | 2.3 |

From these figures it can be seen that stabilizers IN 73 to IN 76 of the invention give a several fold protection against fatigue in comparison to the effect of IPPD.

EXAMPLE IV

Vulcanizates of the composition of example I which contained stabilizers IN 73 to IN 76 were aged for 8 days at 100°C. in hot air in the manner described in example II and the changes in physical properties determined in the same manner as in example II. The following changes were found in the values measured:

| Sample | TS | σ 200 | BD | SH |
|---|---|---|---|---|
| IPPD | −20 | +212 | −57 | +13 |
| IN 73 | −21 | +150 | −56 | + 8 |
| IN 74 | −20 | +150 | −50 | +10 |
| IN 75 | − 5 | +153 | −42 | + 8 |
| IN 76 | −26 | +144 | −52 | + 9 |

Again, surprisingly the change in physical properties of the vulcanizate under the effect of heat and oxygen was less with the stabilizers of the invention than with IPPD. The new protective agents also produce an effective combination of fatigue and age resistant properties.

The fatigue and anti-ageing protective materials of the invention, however, possess in addition the great advantage that vulcanizates stabilized with them do not discolor under the action of light.

EXAMPLE V

There were produced vulcanizates from rubber mixtures of the following compositions which were well suited for testing for stability to light and tested for discoloration under the action of light. There were used the above described IN 61, IN 58, IN 63, IN 62 and IN 59.

| Mixture Composition | Mixture Number (parts by weight) | | | | | |
|---|---|---|---|---|---|---|
| | 1 | 2 | 3 | 4 | 5 | 6 |
| natural rubber ("first crepe") | 100 | 100 | 100 | 100 | 100 | 100 |
| natural chalk | 100 | 100 | 100 | 100 | 100 | 100 |
| stearic acid | 1 | 1 | 1 | 1 | 1 | 1 |

| Mixture Composition | 1 | 2 | 3 | 4 | 5 | 6 |
|---|---|---|---|---|---|---|
| zinc oxide | 5 | 5 | 5 | 5 | 5 | 5 |
| titanium dioxide | 5 | 5 | 5 | 5 | 5 | 5 |
| IPPD | 3 | — | — | — | — | — |
| IN 61 | — | 3 | — | — | — | — |
| IN 58 | — | — | 3 | — | — | — |
| IN 63 | — | — | — | 3 | — | — |
| IN 62 | — | — | — | — | 3 | — |
| IN 59 | — | — | — | — | — | 3 |
| dibenzothiazyldisulfide | 1 | 1 | 1 | 1 | 1 | 1 |
| tetramethylthiurammonosulfide | 0.2 | 0.2 | 0.2 | 0.2 | 0.2 | 0.2 |
| sulfur | 2.2 | 2.2 | 2.2 | 2.2 | 2.2 | 2.2 |

The vulcanization was carried out at 150°C. for 20 minutes. The vulcanizate samples were exposed to light in a Xeno test apparatus 150, System Casella, Original Hanau (following DIN 53 388 or Draft Iso Recommendation 759). The testing of the vulcanizate samples took place at room temperature at a relative atmospheric humidity of 60 to 70%.

The following color changes were produced in the samples at the end of the testing:

| | |
|---|---|
| IPPD | strong dark brown |
| IN 61 | not colored (i.e. no discoloration) |
| IN 58 | not colored |
| IN 63 | not colored |
| IN 62 | not colored |
| IN 59 | not colored |

It can be seen from these results that the protective agents of the present invention impart the previously unattainable combination of properties as stabilizers against growth of cracks, heat and oxygen ageing and discoloration under the effect of light.

Several of the phenylenediamine-s-triazine compounds also have proven to be effective stabilizers against the formation of cracks under the influence of ozone.

EXAMPLE VI

Test samples of vulcanized rubber mixtures having the composition of example I were exposed to the action of ozone according to DIN standards 53 509. The ozone concentration amounted to 50 pphm (50 parts per hundred million) and the testing temperature was 25°C. The formation of cracks was judged after 6, 24 and 48 hours of ozone treatment. Tested were samples which contained the stabilizer IPPD, IN 58, IN 63, IN 62, IN 59, IN 73, IN 71 and IN 70 in the mixture compositions set forth in example I.

The test had the following results:

| Duration of ozone treatment (hours) | 6 | 24 | 48 |
|---|---|---|---|
| IPPD | + | + | + |
| IN 58 | ++ | + | 0 |
| IN 63 | ++ | 0 | + |
| IN 62 | + | 0 | 0 |
| IN 59 | ++ | ++ | + |
| IN 73 | ++ | + | + |
| IN 70 | + | + | + |
| IN 71 | + | + | + |

The significance of the code is:

0 means moderate ozone protection
+ means good ozone protection
++ means very good ozone protection Thus it has been shown that the triazine compounds of the invention which contain phenylenediamine groups or phenylenediamine derivatives as ligands are novel stabilizers for rubbers which have a previously unattainable combination of activity with regard to protection against fatigue, protection against ageing, non-discoloration and, by suitable selection of substituents on the triazine ring, protection against damage by ozone.

These new stabilizers can be employed with great industrial advantage in the production of carbon black containing and light colored industrial articles in all types of rubber as well as also in the production of tires for vehicles of all types.

In the following examples the following stabilizers were used as indicated.

EXAMPLE VII

| Code | Chemical Designation |
|---|---|
| IN 70 | N,N'-bis-(4-chloro-6-α-naphthylamino-triazinyl-2)-p-phenylenediamine |
| IN 71 | N,N'-bis-(4-chloro-6-[1,3-dimethylbutylamino]-triazinyl-2)-p-phenylenediamine |
| IN 72 | N,N'-bis-(4-chloro-6-iso-propylamino-triazinyl-2)-p-phenylenediamine |
| IN 83 | N,N'-bis-(4-iso-propylamino-6-amino-triazinyl-2)-p-phenylenediamine |
| IN 93 | N,N'-bis-(4-allylamino-6-methylthio-triazinyl-2)-p-phenylenediamine |
| IN 94 | N,N'-bis-(4-allylamino-6-dodecylthio-triazinyl-2)-p-phenylenediamine |
| IN 95 | N,N'-bis-(4-allylamino-6-methoxy-triazinyl-2)-p-phenylenediamine |
| IN 96 | N,N'-bis-(4-chloro-6-tert-butylamino-triazinyl-2)-p-phenylenediamine |
| IN 114 | N,N'-bis-(4-chloro-6-cyclohexylamino-triazinyl-2)-p-phenylenediamine |
| IN 118 | N,N'-bis-(4-chloro-6-iso-propylamino-triazinyl-2)-p-phenylenediamine |
| IN 119 | N,N'-bis-(4-allylamino-6-n-butoxy-triazinyl-2)-p-phenylenediamine |
| IN 121 | N,N'-bis-(4-allylamino-6-[2-ethoxy-1]-triazinyl-2)-p-phenylenediamine |
| IN 127 | N,N'-bis-(4-ethylamino-6-methoxy-triazinyl-2)-p-phenylenediamine |
| IN 134 | N,N'-bis-(4-[4-phenylamino-anilino]-6-methoxy-triazinyl-2)-p-phenylenediamine |
| IN 73 | N-phenyl-N'-(4-chloro-6-amino-triazinyl-2)-p-phenylenediamine |
| IN 74 | N-phenyl-N'-(4-chloro-6-allylamino-triazinyl-2)-p-phenylenediamine |
| IN 75 | N-phenyl-N'-(4-chloro-6-iso-propylamino-triazinyl-2)-p-phenylenediamine |
| IN 76 | N-phenyl-N'-(4-chloro-6-[1,3-dimethylbutylamino]-triazinyl-2)-p-phenylenediamine |
| IN 79 | N-phenyl-N'-(4-chloro-6-methylthio-triazinyl-2)-p-phenylenediamine |
| IN 87 | N-1,3-dimethylbutyl-N'-(4-chloro-6-isopropylaminotriazinyl-2)-p-phenylenediamine |
| IN 88 | N-1,3-dimethylbutyl-N'-(4-chloro-6-allylaminotriazinyl-2)-p-phenylenediamine |
| IN 102 | N-phenyl-N'-(4-amino-6-methoxy-triazinyl-2)-p-phenylenediamine |
| IN 104 | N-phenyl-N'-(4-amino-6-allyloxy-triazinyl-2)-p-phenylenediamine |
| IN 107 | N-phenyl-N'-(4-amino-6-diethylamino-triazinyl-2)-p-phenylenediamine |
| IN 108 | N-phenyl-N'-(4-amino-6-allylamino-triazinyl-2)-p-phenylenediamine |
| IN 113 | N-phenyl-N'-(4-chloro-6-cyclohexylamino-triazinyl-2)-p-phenylenediamine |
| IN 117 | N-phenyl-N'-(4-chloro-6-[2-hydroxy-propylamino]-triazinyl-2)-p-phenylenediamine |
| IN 151 | N-phenyl-N'-(4-chloro-6-ethylamino-triazinyl-2)-p-phenylenediamine |

Each of the above designated compounds was employed in the recipe described in Example I for the production of vulcanizates and these vulcanizates compared with the same recipe employing IPPD as the anti-ager.

The comparative testing was on the growth of cracks from 4 to 8 mm long in the samples in the unaged condition and in the condition after 6 days aging at 100°C. As in Example 1 the number of bends required to produce the growth of cracks was determined and the ratio calculated.

Ratio of the Number of Bends (for crack growth from 4 to 8 mm) IN to IPPD

| Compound | Unaged | Aged 6 days at 100°C. |
|---|---|---|
| IN 70 | 3.7 | 1.8 |
| IN 71 | 3.6 | 2.1 |
| IN 72 | 1.9 | 2.9 |
| IN 83 | 1.3 | 1.2 |

-continued

| Ratio of the Number of Bends (for crack growth from 4 to 8 mm) IN to IPPD | | |
|---|---|---|
| Compound | Unaged | Aged 6 days at 100°C. |
| IN 93 | 1.9 | 1.9 |
| IN 94 | 1.8 | 2.3 |
| IN 95 | 2.9 | 8.2 |
| IN 96 | 3.7 | 2.3 |
| IN 114 | 4.3 | 3.4 |
| IN 118 | 1.6 | 0.8 |
| IN 119 | 1.8 | 4.2 |
| IN 121 | 1.6 | 2.7 |
| IN 127 | 1.3 | 1.9 |
| IN 134 | 1.6 | 1.5 |
| IN 73 | 13.9 | 2.3 |
| IN 74 | 3.4 | 2.6 |
| IN 75 | 2.5 | 1.4 |
| IN 76 | 2.2 | 1.7 |
| IN 79 | 1.4 | 1.9 |
| IN 87 | 4.5 | 3.2 |
| IN 88 | 2.6 | 1.5 |
| IN 102 | 1.3 | 2.4 |
| IN 104 | 1.7 | 3.3 |
| IN 107 | 1.2 | 2.9 |
| IN 108 | 1.5 | 2.3 |
| IN 113 | 1.5 | 1.7 |
| IN 117 | 2.6 | 3.2 |
| IN 151 | 1.5 | 1.2 |

From the values set forth above there can be seen the surprising effectiveness of the stabilizers of the invention in comparison to the customarily frequently employed p-phenylenediamine derivatives.

EXAMPLE VIII

The same stabilizers of the invention as in Example VII were compared again with IPPD after working into the same rubber mixture as in Example I and producing vulcanizates at 160°C. as in Example I and testing samples in (a) the unaged condition and (b) after ageing for 6 days at 100°C. using the same 4 tests as in Example II wherein the value recited in the table below for (a) is the actual measurement in the unaged condition and the value for (b) is the change in this measured value after ageing measured in % except for the Shore hardness which is measured in points.

In the right column the color determinations were made on the samples after testing in the Xeno test apparatus according to the procedure in Example V. The IPPD under the same conditions produced a very strong coloration (dark brown) in the test sample:

| | | | TS in kg/cm² | 200 in kg/cm² | BD in % | SH | coloring (discoloration) |
|---|---|---|---|---|---|---|---|
| IN | 70 | a | 158 | 30 | 665 | 60 | slightly colored |
| | | b | − 9 | + 140 | − 44 | +10 | |
| IN | 71 | a | 153 | 33 | 610 | 62 | slightly colored |
| | | b | − 18 | + 121 | − 47 | + 9 | |
| IN | 72 | a | 160 | 34 | 630 | 63 | slightly colored |
| | | b | − 11 | + 124 | − 41 | + 7 | |
| IN | 83 | a | 178 | 42 | 575 | 61 | not colored |
| | | b | − 22 | + 131 | − 50 | + 7 | |
| IN | 93 | a | 175 | 27 | 690 | 57 | not colored |
| | | b | − 13 | + 144 | − 40 | + 8 | |
| IN | 94 | a | 184 | 27 | 690 | 54 | not colored |
| | | b | − 20 | + 156 | − 47 | + 9 | |
| IN | 95 | a | 170 | 26 | 725 | 58 | not colored |
| | | b | − 14 | + 108 | − 34 | + 5 | |
| IN | 96 | a | 161 | 34 | 635 | 60 | not colored |
| | | b | − 17 | + 127 | − 47 | + 9 | |
| IN | 114 | a | 146 | 33 | 635 | 61 | not colored |
| | | b | − 18 | + 112 | − 48 | + 6 | |
| IN | 118 | a | 144 | 38 | 515 | 58 | slightly colored |
| | | b | − 14 | + 155 | − 50 | +12 | |
| IN | 119 | a | 175 | 33 | 690 | 58 | not colored |
| | | b | − 27 | + 130 | − 51 | −10 | |
| IN | 121 | a | 154 | 30 | 670 | 55 | not colored |
| | | b | − 8 | + 167 | − 43 | +12 | |
| IN | 127 | a | 169 | 35 | 615 | 59 | not colored |
| | | b | − 20 | + 111 | − 41 | + 9 | |
| IN | 134 | a | 178 | 37 | 655 | 59 | not colored |
| | | b | − 17 | + 127 | − 49 | +11 | |
| IN | 73 | a | 149 | 32 | 650 | 62 | colored |
| | | b | − 11 | + 125 | − 47 | + 9 | |
| IN | 74 | a | 171 | 34 | 655 | 62 | colored |
| | | b | − 19 | + 121 | − 45 | +10 | |
| IN | 75 | a | 153 | 34 | 570 | 61 | colored |
| | | b | − 16 | + 118 | − 43 | + 6 | |
| IN | 76 | a | 176 | 34 | 640 | 59 | colored |
| | | b | − 12 | + 115 | − 38 | + 8 | |
| IN | 79 | a | 169 | 38 | 605 | 62 | colored |
| | | b | − 18 | + 90 | − 40 | + 7 | |
| IN | 87 | a | 160 | 31 | 690 | 60 | colored |
| | | b | − 11 | + 139 | − 46 | + 9 | |
| IN | 88 | a | 161 | 36 | 630 | 62 | colored |
| | | b | − 7 | + 142 | − 46 | + 9 | |
| IN | 102 | a | 175 | 36 | 630 | 62 | slightly colored |
| | | b | − 21 | + 133 | − 47 | + 8 | |
| IN | 104 | a | 160 | 33 | 655 | 61 | colored |
| | | b | − 13 | + 155 | − 47 | + 9 | |
| IN | 107 | a | 160 | 40 | 540 | 59 | colored |
| | | b | − 32 | + 123 | − 55 | + 9 | |
| IN | 108 | a | 142 | 37 | 545 | 63 | colored |
| | | b | − 27 | + 114 | − 52 | + 7 | |
| IN | 113 | a | 147 | 38 | 540 | 60 | colored |
| | | b | − 26 | + 97 | − 46 | + 7 | |
| IN | 117 | a | 165 | 34 | 640 | 58 | weakly colored |
| | | b | − 14 | + 153 | − 46 | +13 | |
| IN | 151 | a | 172 | 39 | 600 | 61 | colored |
| | | b | − 20 | + 100 | − 43 | + 5 | |
| IPPD | | b) | − 20 | + 212 | − 57 | +13 | very strongly colored |

Again there is shown in summarized fashion the superior effects of the stabilizers of the invention in the evaluation of the changes in physical properties of the vulcanizates under the influence of heat and light in comparison to IPPD. Furthermore, the anti-ageing and fatigue protective agents of the invention have a definitely better resistance to dis-coloration under the influence of light than IPPD. Furthermore the compounds of the invention that have groups that are symmetrically attached (for example IN 83, 93, 94, 95, etc.) produce a definite protective action against light since samples with these stabilizers showed practically no discoloration even after 6 days light treatment in the Xeno test apparatus.

Additional specific stabilizers which are suitable in the invention are N,N'-bis-[4-chloro-6-(4-phenylamino-anilino)-triazinyl-2]-p-phenylenediamine wherein there is the group

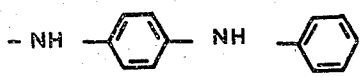

in the 6 position of the triazine ring. This group can also be designated as 4-phenylamino-phenylamino. Similar compounds can also be used where in place of the chloro group in the 4-position there can be used Y ligands as, for example, -CN, -OH, -OR₂ or -SR₁ as f.i. compounds such as N-Phenyl-N'-(4-cyano-6-amino-triazinyl-2)-p-phenylenediamine, (4-chloro-6-amino-triazinyl)-2-p-phenylenediamine, (4-hydroxy-6-amino-triazinyl-2)-p-phenylenediamine, N-phenyl-N'-[4,6-bis-(4-phenylamino-anilino)-triazinyl]-2-p-phenylenediamine, N-phenyl-N'-[4-methoxy-6-(4'-phenylamino-anilino)-triazinyl-2]-p-phenylenediamine, N-phenyl-N'-[4-chloro-6-(4'-phenylamino-anilino)-triazinyl-2]-p-phenylenediamine, N-phenyl-N'-[4-methylthio-(4'-phenylaminoanilino)-triazinyl-2]-p-phenylenediamine, N-phenyl-N'-[4-octylthio-6-(4'-phenylamine-anilino)-triazinyl-2]-p-phenylenediamine, or N-phenyl-N'-[4-dodecylthio-6-(4'-phenylamino-anilino)-triazinyl-2]-p-phenylenediamine.

What is claimed is:
1. A 1, 3, 5-triazine of the formula:

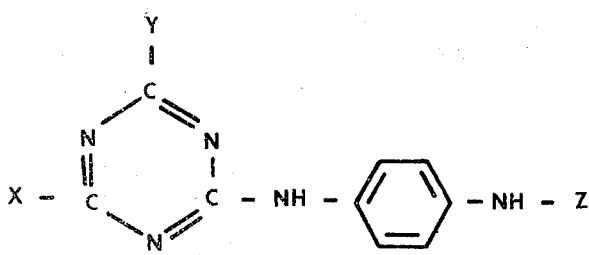

wherein:
Y is (1) SR₁, where R₁ is alkyl of 1 to 12 carbon atoms, phenyl, or cresyl, (2) CN, (3) OR₂, where R₂ is alkyl of 1 to 12 carbon atoms, phenyl, alkylphenyl having 1 to 5 carbon atoms in the alkyl group, allyl or methallyl, or (4)

where R₃ and R₄ are hydrogen, allyl, methallyl, cycloalkyl of 5 to 8 carbon atoms, phenyl, methylphenyl, naphthyl or benzyl, alkyl of 1 to 18 carbon atoms, alkyl of 1 to 18 carbon atoms substituted with —OH, —CN or OR₅ where R₅ is alkyl of 1 to 18 carbon atoms, one of R₃ and R₄ is alpha or beta naphthyl with the proviso that the other is hydrogen, R₃ and R₄ together with the nitrogen atom are piperazino, piperidino, morpholino, thiomorpholino or pyrrolidino;

X is chlorine;
Z is alkyl of 1 to 18 carbon atoms, cycloalkyl of 5 to 8 carbon atoms, phenyl, benzyl, acyl of the formula:

where R₇ is alkyl of 1 to 18 carbon atoms, benzyl or phenyl or the group:

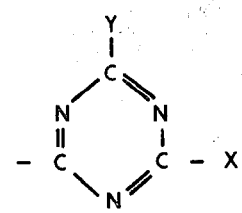

with the proviso that when Z is:

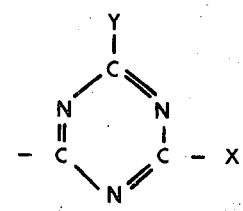

and X and Y are

at least one of R₃ and R₄ is allyl or methallyl.
2. A compound according to claim 1 wherein R₁ is alkyl of 1 to 12 carbon atoms, phenyl, cresyl, CN, OR₂ where R₂ is alkyl of 1 to 12 carbon atoms, phenyl, alkylphenyl having 1 to 5 carbon atoms in the alkyl group, allyl or methallyl,

where R₃ is hydrogen, allyl, methallyl, cycloalkyl of 5 to 8 carbon atoms, phenyl, methylphenyl, naphthyl or benzyl, alkyl of 1 to 18 carbon atoms substituted with —OH, —CN or OR₅ where R₅ is alkyl of 1 to 18 carbon atoms, R₄ is hydrogen, allyl, methallyl, cycloalkyl of 5 to 8 carbon atoms, alkyl of 1 to 18 carbon atoms substituted with —OH, —CN or OR₅ with the proviso that when R₃ is naphthyl R₄ is hydrogen, R₃ and R₄ together with the nitrogen atoms are piperazino, piperidino, morpholino, thiomorpholino or pyrrolidino.
3. A compound according to claim 1 where Z is:

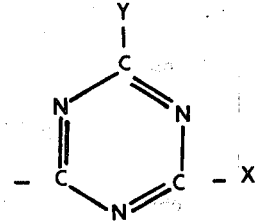

4. A compound according to claim 3 where Y is

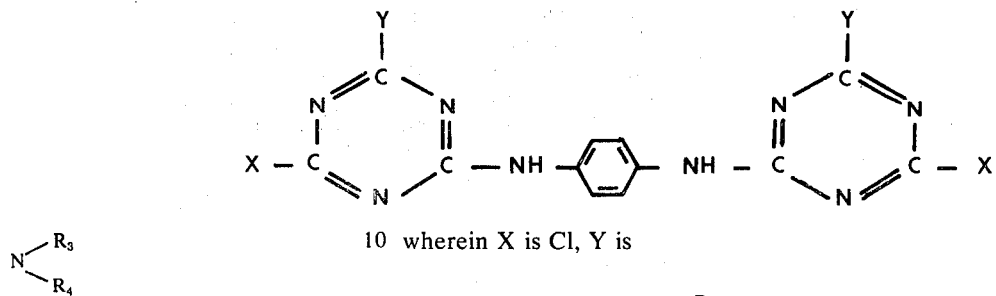

10 wherein X is Cl, Y is

where $R_3$ is hydrogen, phenyl, alkyl of 1 to 8 carbon atoms, allyl, methallyl or naphthyl and $R_4$ is hydrogen or allyl.

5. A compound according to claim 1 where Z is phenyl or alkyl of 1 to 8 carbon atoms.

6. A compound according to claim 5 where Z is phenyl and Y is

where $R_3$ and $R_4$ are hydrogen, allyl methallyl or alkyl of 1 to 8 carbon atoms.

7. A compound according to claim 6 where $R_4$ is hydrogen or allyl.

8. A 1, 3, 5-triazine of the formula:

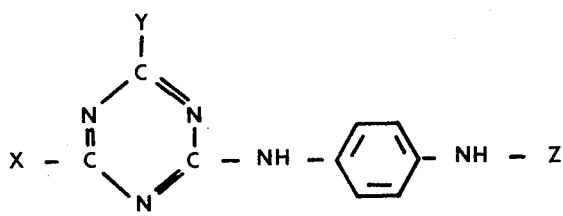

wherein:
Y is $SR_1$, where $R_1$ is alkyl of 1 to 12 carbon atoms, phenyl, cresyl, CN, $OR_2$ where $R_2$ is alkyl of 1 to 12 carbon atoms, phenyl, alkylphenyl having 1 to 5 carbon atoms in the alkyl group, allyl or methallyl,

where $R_3$ and $R_4$ are hydrogen, allyl, methallyl, cycloalkyl of 5 to 8 carbon atoms, phenyl, methylphenyl, naphthyl of 1 to 18 carbon atoms, alkyl of 1 to 18 carbon atoms substituted with —OH, —CN or $OR_5$ where $R_5$ is alkyl of 1 to 18 carbon atoms, one of $R_3$ and $R_4$ is alpha or beta naphthyl with the proviso that the other is hydrogen, $R_3$ and $R_4$ together with the nitrogen atom are piperazino, piperidino, morpholino, thiomorpholino or pyrrolidino,
X is as defined for Y or is chlorine;
Z is alkyl of 1 to 8 carbon atoms, cycloalkyl of 5 to 8 carbon atoms, phenyl, benzyl, acyl of the formula $$-\overset{O}{\underset{\|}{C}}-R_7$$

where $R_7$ is alkyl of 1 to 18 carbon atoms, benzyl or phenyl.

9. A 1,3,5-triazine of the formula:

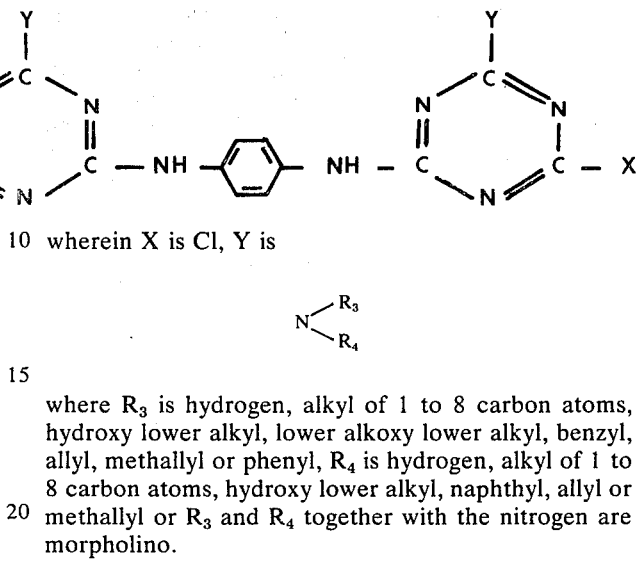

wherein X is Cl, Y is

where $R_3$ is hydrogen, alkyl of 1 to 8 carbon atoms, hydroxy lower alkyl, lower alkoxy lower alkyl, benzyl, allyl, methallyl or phenyl, $R_4$ is hydrogen, alkyl of 1 to 8 carbon atoms, hydroxy lower alkyl, naphthyl, allyl or methallyl or $R_3$ and $R_4$ together with the nitrogen are morpholino.

10. A 1, 3, 5-triazine of the formula:

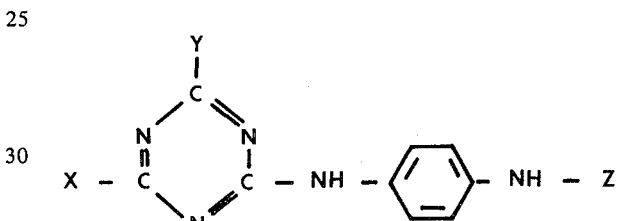

wherein:
Y is $SR_1$, where $R_1$ is alkyl of 1 to 12 carbon atoms, phenyl, cresyl, CN, $OR_2$ where $R_2$ is alkyl of 1 to 12 carbon atoms, phenyl, alkylphenyl having 1 to 5 carbon atoms in the alkyl group, allyl or methallyl,

where $R_3$ and $R_4$ are hydrogen, allyl, methallyl, cycloalkyl of 5 to 8 carbon atoms, phenyl, methylphenyl, naphthyl or benzyl, alkyl of 1 to 18 carbon atoms, alkyl of 1 to 18 carbon atoms substituted with —OH, —CN or $OR_5$ where $R_5$ is alkyl of 1 to 18 carbon atoms, one of $R_3$ and $R_4$ is alpha or beta naphthyl with the proviso that the other is hydrogen, $R_3$ and $R_4$ together with the nitrogen atoms are piperazino, piperidino, morpholino, thiomorpholino or pyrrolidino;
X is as defined for Y or is chlorine and at least one of X and Y is $OR_2$ or

and at least one $R_2$, $R_3$ and $R_4$ is allyl or methallyl;
Z is alkyl of 1 to 8 carbon atoms, cycloalkyl of 5 to 8 carbon atoms, phenyl, benzyl, acyl of the formula:

where $R_7$ is alkyl of 1 to 18 carbon atoms, benzyl or phenyl or the group.

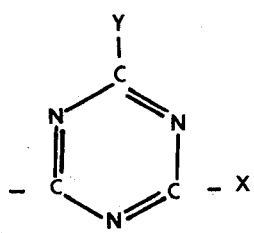

11. A compound according to claim 10 wherein any aryl group present as $R_1$ is phenyl or cresyl, as $R_2$ is phenyl or alkylphenyl with 1 to 5 carbon atoms, as $R_3$ is phenyl, methylphenyl or naphthyl and $R_4$ is other than aryl.

12. A compound according to claim 10 wherein X is chlorine, lower alkoxy, allyloxy, or alkylmercapto or

where $R_4$ is lower alkyl and Y is

where $R_3$ is hydrogen, allyl, methallyl, or alkyl of 1 to 8 carbon atoms and $R_4$ is hydrogen and Z is phenyl or alkyl of 1 to 8 carbon atoms.

13. A compound according to claim 12 wherein X is chlorine.

14. A compound according to claim 10 where X is allyloxy.

15. A compound according to claim 10 wherein X is allyloxy or methallyloxy.

16. A compound according to claim 10 wherein X is

and $R_3$ is allyl or methallyl.

17. A compound according to claim 16 wherein $R_3$ is allyl and $R_4$ is hydrogen.

18. A compound according to claim 10 wherein Y is

and $R_3$ is allyl or methallyl.

19. A compound according to claim 18 where $R_4$ is hydrogen.

20. A compound according to claim 18 wherein $R_3$ and $R_4$ are both allyl.

21. A compound according to claim 18 wherein $R_3$ is allyl and $R_4$ is hydrogen.

22. A 1, 3, 5-triazine of the formula:

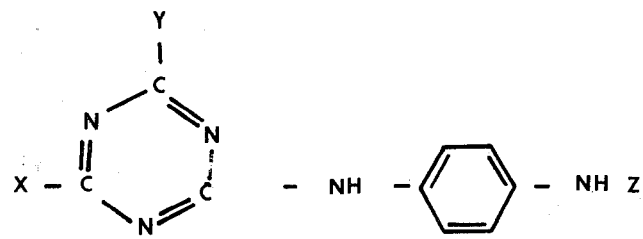

wherein Y is $SR_1$ where $R_1$ is alkyl of 1 to 12 carbon atoms, phenyl, cresyl, CN, $OR_2$ where $R_2$ is alkyl of 1 to 12 carbon atoms, phenyl, alkylphenyl having 1 to 5 carbon atoms in the alkyl group, allyl or methallyl,

where $R_3$ and $R_4$ are hydrogen, allyl, methallyl, cycloalkyl of 5 to 8 carbon atoms, phenyl, methylphenyl, naphthyl or benzyl, alkyl of 1 to 18 carbon atoms, alkyl of 1 to 18 carbon atoms substituted with —OH, —CN or $OR_5$ where $R_5$ is alkyl of 1 to 18 carbon atoms, one of $R_3$ and $R_4$ is alpha or beta naphthyl with the proviso that the other is hydrogen, $R_3$ and $R_4$ together with the nitrogen atom are piperazino, piperidino, morpholino, thiomorpholino or pyrrolidino, X is as defined for Y or is chlorine;

Z is alkyl of 1 to 8 carbon atoms, cycloalkyl of 5 to 8 carbon atoms, phenyl, benzyl, acyl of the formula:

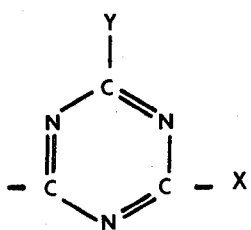

where $R_7$ is alkyl of 1 to 18 carbon atoms, benzyl or phenyl or the group:

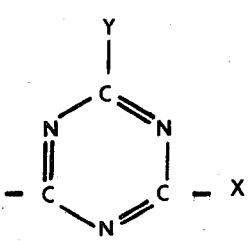

with the proviso that when Z is:

and X and Y are
at least one of $R_3$ and $R_4$ is allyl or methallyl.
* * * * *